(12) United States Patent
Stott (10) Patent No.: US 8,206,200 B2
(45) Date of Patent: Jun. 26, 2012

(54) EXTENSION POLE APPARATUS FOR SANDER

(75) Inventor: Darren Andrew Stott, Ferntree Gull (AU)

(73) Assignee: D & S Stott Pty Ltd, Ferntree Gully (AU)

( * ) Notice: Subject to any disclaimer, the term of this patent is extended or adjusted under 35 U.S.C. 154(b) by 623 days.

(21) Appl. No.: 12/443,147

(22) PCT Filed: Sep. 27, 2007

(86) PCT No.: PCT/AU2007/001441
§ 371 (c)(1), (2), (4) Date: Mar. 26, 2009

(87) PCT Pub. No.: WO2008/037021
PCT Pub. Date: Apr. 3, 2008

(65) Prior Publication Data
US 2010/0048108 A1    Feb. 25, 2010

(30) Foreign Application Priority Data

Sep. 27, 2006   (AU) ................................ 2006905345

(51) Int. Cl.
*B24B 23/00*    (2006.01)

(52) U.S. Cl. ............. 451/344; 451/356; 269/24; 269/27
(58) Field of Classification Search .................. 451/344, 451/356–358, 354, 351; 269/24, 27, 20, 269/25, 3, 6; 403/109.1, 315, 316, 319; 248/200, 248/300, 224.7; 15/49.1, 98
See application file for complete search history.

(56) References Cited

U.S. PATENT DOCUMENTS

| | | | | |
|---|---|---|---|---|
| 2,168,121 A | * | 8/1939 | French | 15/144.1 |
| 3,586,057 A | * | 6/1971 | Lambert | 138/99 |
| 3,643,988 A | * | 2/1972 | Ingvartsen | 403/49 |

(Continued)

FOREIGN PATENT DOCUMENTS

DE    3138516 A1    8/1982

(Continued)

OTHER PUBLICATIONS

International Search Report mailed Nov. 14, 2007, in corresponding International Application No. PCT/AU2007/001441, filed Sep. 27, 2007.

*Primary Examiner* — George Nguyen
(74) *Attorney, Agent, or Firm* — Christensen O'Connor Johnson Kindness PLLC (57) ABSTRACT

Extension pole apparatus includes an attachment component (20,100) having an elongate body (22,105) that is adapted to receive a tubular or rod like component so that the latter extends generally parallel to the longitudinal direction of the body. A pair of plates (24,25;110*a*,110*b*) are mounted to and project laterally from the body. The plates extend generally parallel to the longitudinal direction of the body for receiving between them an aligned element of a powered sanding apparatus, which aligned element is a hollow shaft or a rib of a motor unit of the apparatus. Means (29,155) is included by which the plates may be rigidly fastened to the aligned element. A tubular or rod like component is receivable into the elongate body, and means (23,165) is provided by which the tubular or rod like component may be fastened to the attachment component while it is received in the elongate body.

29 Claims, 8 Drawing Sheets

U.S. PATENT DOCUMENTS

| | | | |
|---|---|---|---|
| 4,204,292 A * | 5/1980 | Lester et al. | 15/28 |
| 4,515,423 A | 5/1985 | Moore | |
| 4,663,796 A * | 5/1987 | Helling et al. | 15/144.2 |
| 4,685,252 A * | 8/1987 | Ponce | 451/354 |
| 4,829,719 A * | 5/1989 | Braselton | 451/354 |
| 5,070,576 A | 12/1991 | Banta | |
| 5,099,539 A * | 3/1992 | Forester | 15/144.3 |
| 5,144,774 A | 9/1992 | Conboy | |
| 5,193,313 A * | 3/1993 | Sanchez et al. | 451/344 |
| 5,239,783 A * | 8/1993 | Matechuk | 451/354 |
| 5,411,238 A | 5/1995 | Caron | |
| 5,545,080 A * | 8/1996 | Clowers et al. | 451/359 |
| 5,611,634 A * | 3/1997 | Wang | 403/102 |
| 5,833,014 A * | 11/1998 | Dunn | 173/162.2 |
| 5,885,145 A * | 3/1999 | O'Mara | 451/356 |
| 6,032,321 A | 3/2000 | Shirey | |
| 6,367,121 B1 | 4/2002 | MacMillan | |
| 6,412,138 B1 * | 7/2002 | MacMillan | 15/144.2 |
| 6,468,141 B1 * | 10/2002 | Conboy et al. | 451/354 |
| 6,520,846 B1 * | 2/2003 | Forbes et al. | 451/359 |
| 6,719,259 B2 * | 4/2004 | Huang et al. | 248/441.1 |
| 6,793,568 B2 * | 9/2004 | Dotta | 451/357 |
| 7,155,770 B2 * | 1/2007 | Anderson et al. | 15/111 |
| 7,156,728 B1 * | 1/2007 | Killough | 451/361 |
| 7,203,986 B2 * | 4/2007 | Pears et al. | 15/28 |
| 7,249,996 B1 * | 7/2007 | Volyar | 451/354 |
| 7,331,567 B2 * | 2/2008 | Li | 254/95 |
| 7,717,300 B1 * | 5/2010 | Yarrusso, Jr. | 222/174 |
| 7,780,506 B2 * | 8/2010 | Wettstein et al. | 451/354 |
| 7,887,395 B2 * | 2/2011 | Weiford et al. | 451/359 |
| 2001/0051501 A1 * | 12/2001 | Pellegrin | 451/354 |
| 2005/0183222 A1 * | 8/2005 | Grohe | 15/49.1 |

FOREIGN PATENT DOCUMENTS

| | | |
|---|---|---|
| EP | 1616671 A1 | 1/2006 |
| NZ | 337010 A | 9/1999 |

* cited by examiner

EXTENSION POLE APPARATUS FOR SANDER

FIELD OF THE INVENTION

The present invention relates generally to powered sanding equipment.

BACKGROUND OF THE INVENTION

Known sanding equipment include a motor unit. Projecting from one end of the motor unit is a first hollow shaft that terminates in a sanding head. Projecting from the other end of the motor unit is a second hollow shaft that communicates with a tube connected to a vacuum unit.

In use the operator holds the motor unit and/or the shaft to manipulate the device, the motor unit drives the sanding head, and the vacuum unit draws away the dust produced by sanding (via the shaft and the motor unit).

The combined lengths of the shafts allows for some reach. This reach is often insufficient to contact all of the surfaces to be sanded without the aid of a ladder or scaffolding, such as when sanding the wall within a stairwell.

Safety regulations have been introduced that prohibit the use of ladders or simple scaffolds in many circumstances, thus requiring more expensive and time consuming scaffold arrangements. Frequently, the time required to install and remove such a scaffold is more than is required to complete the sanding operation.

It is an object of the invention to at least in part alleviate this disadvantage by obviating the need to employ scaffolds to apply the sanding head of powered sanding devices to higher wall and ceiling surfaces.

SUMMARY OF THE INVENTION

It is of course known to employ telescopic pole devices to extend the reach of a variety of tools with handles. The present invention adopts a telescopic pole device in one of its embodiments but instead of applying the device to the sanding head, which would be in line with conventional thinking, there is proposed an extension pole apparatus specially adapted for attachment to the shaft or motor unit of powered sanding equipment.

In a first aspect, the invention provides an extension pole apparatus that includes an attachment component having an elongate body that is adapted to receive a tubular or rod like component so that the latter extends generally parallel to the longitudinal direction of the body. A pair of plates are mounted to and project laterally from the body. The plates extend generally parallel to the longitudinal direction of the body for receiving between them an aligned element of a powered sanding apparatus, which aligned element is a hollow shaft or a rib of a motor unit of the apparatus. Means is included by which the plates may be rigidly fastened to the aligned element. A tubular or rod like component is receivable into the elongate body, and means is provided by which the tubular or rod like component may be fastened to the attachment component while it is received in the elongate body.

In an embodiment the pair of plates are of generally curved profile and are pivotally mounted to the elongate body so that they may be moved apart and then brought together about and clamped to a hollow shaft of a powered sanding apparatus. The pivotally mounted plates may have respective hinge portions spaced along an edge of the plate that are pivotally mounted to the elongate body. Preferably, the pivotally mounted plates further include at least two pairs of longitudinally spaced complementary holes for receiving clamping bolts or the like.

A second aspect of the invention provides powered sanding apparatus having a sanding head coupled by a hollow shaft to a motor unit for driving the sanding head. An attachment component has an elongate body that is adapted to receive a tubular or rod like component so that the latter extends generally parallel to the longitudinal direction of the body, and means is provided to attach the elongate body to the hollow shaft or motor unit so that the body is adjacent the hollow shaft and generally aligned with the hollow shaft.

In a second aspect, the attachment component may further include a pair of plates that are mounted to and project laterally from the elongate body, which plates extend generally parallel to the longitudinal direction of the body for receiving between them the hollow shaft or a rib of the motor unit, and means by which the plates may be rigidly fastened to the hollow shaft or rib.

In an embodiment, the attachment component is mounted to the hollow shaft or motor unit.

The apparatus of the second aspect may further include a tubular or rod like component receivable into the elongate body, and means by which the tubular or rod like component may be fastened to the attachment component while it is received in the elongate body.

In a third aspect, the invention provides an extension pole apparatus, including an attachment component having an elongate body that is adapted to receive a tubular or rod like component so that the latter extends generally parallel to the longitudinal direction of the body, at least one plate that is mounted to and projects laterally from the body, which plate extends generally parallel to the longitudinal direction of the body, and means by which the plate may be rigidly fastened to a hollow shaft, or to a projecting rib of a motor unit, of a powered sanding apparatus. A tubular or rod like component is receivable into the elongate body, and means is provided by which the tubular or rod like component may be fastened to the attachment component while it is received in the elongate body.

In all aspects of the invention, the tubular or rod like component is preferably a telescopic assembly. The telescopic assembly may have an intermediate outer tube and respective inner tubes slidably receivable into the intermediate outer tube at its respective ends, at least one of the inner tubes being receivable into the elongate body.

A handle or grip may be attachable to an end of the telescopic assembly remote from an end receivable into the elongate body.

In an embodiment, the means by which the tubular or rod like component may be fastened to the attachment component includes a spaced pair of transverse holes in the elongate body.

In a fourth aspect, the invention provides an attachment component for an extension pole apparatus, including an elongate body that is adapted to receive a tubular or rod like component so that the latter extends generally parallel to the longitudinal direction of the body, and a pair of plates that are mounted to and project laterally from the elongate body, which plates extend generally parallel to the longitudinal direction of the body for receiving between them an aligned element of a powered sanding apparatus, which aligned element is a hollow shaft from a rib of a motor unit of the apparatus, and means by which a tubular or rod like component may be fastened to the attachment component while it is received in said body of the attachment component.

BRIEF DESCRIPTION OF THE DRAWINGS

The invention will now be further described, by way of example only, with reference to the accompanying drawings, in which.

DETAILED DESCRIPTION OF EMBODIMENTS OF THE INVENTION

Figure 1:
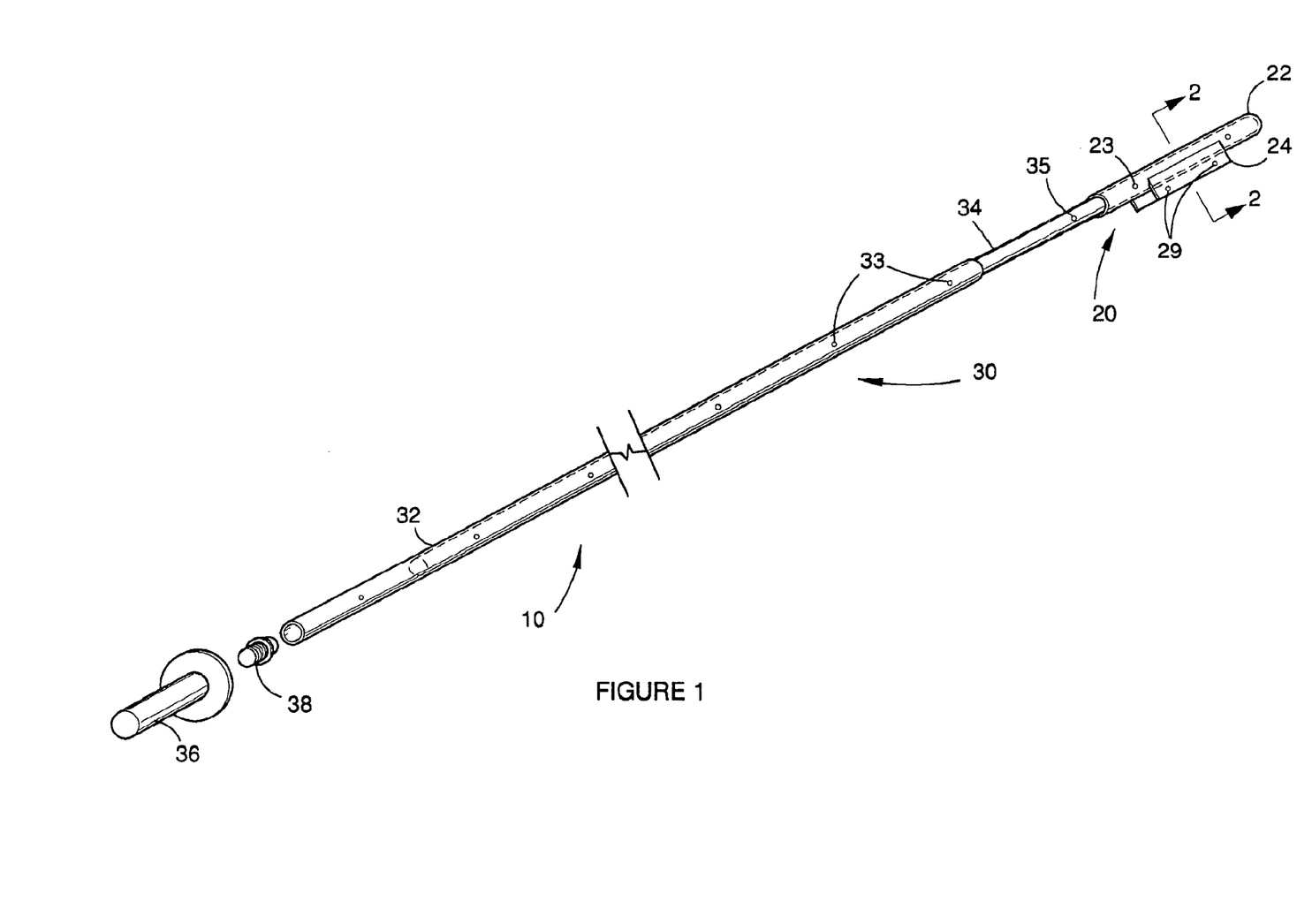
FIG. 1 is an isometric view of extension pole apparatus according to a first embodiment of the invention, partially exploded for the purpose of illustration.
Figure 2:
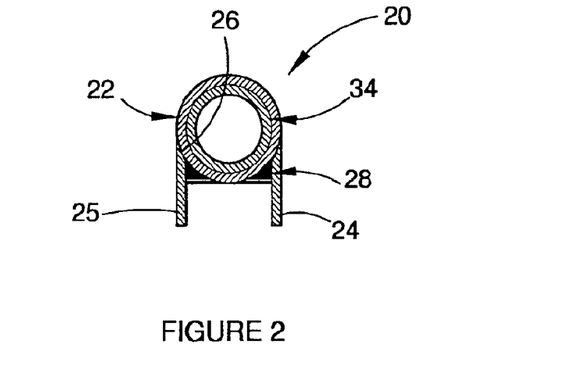
FIG. 2 is a cross-section on the line 2-2 in FIG. 1, showing the extension pole apparatus fixed to a motor unit of powered sanding equipment.

The extension pole apparatus 10 illustrated in FIGS. 1 and 2 includes two principal components, an attachment component 20 and a tubular telescopically extensible pole component 30. Attachment component 20 has a tubular body 22 and, fixed to and projecting laterally from tubular body 22, a pair of parallel plates 24, 25 that are elongate parallel to the longitudinal axial direction of tubular body 22. As best seen in FIG. 2, plates 24, 25 project generally tangentially from tubular body 22, or more precisely slightly off tangential so that there is no step at the respective boundaries. To facilitate this, one side edge or each of plates 24, 25 is shaped to conform to the cylindrical face of the tubular body, as indicated at 26 in FIG. 2. The component is fashioned in aluminium with welds 28 in the included angles between plates 24, 25 and tubular body 22.

Telescopically extensible component 30 comprises an outer tube 32 of similar inner and outer diameter to tubular body 22 and an inner tube 34 that snugly but smoothly slides into tubular body 22 and outer tube 32. The shortest form of the extension pole apparatus arises when outer tube 32 abuts the end of tubular body 22.

The distal end of outer tube 32 carries a hand grip or other handle 36 that is retained on the tube by an intervening friction-fit plug connector 38.

Figure 3:
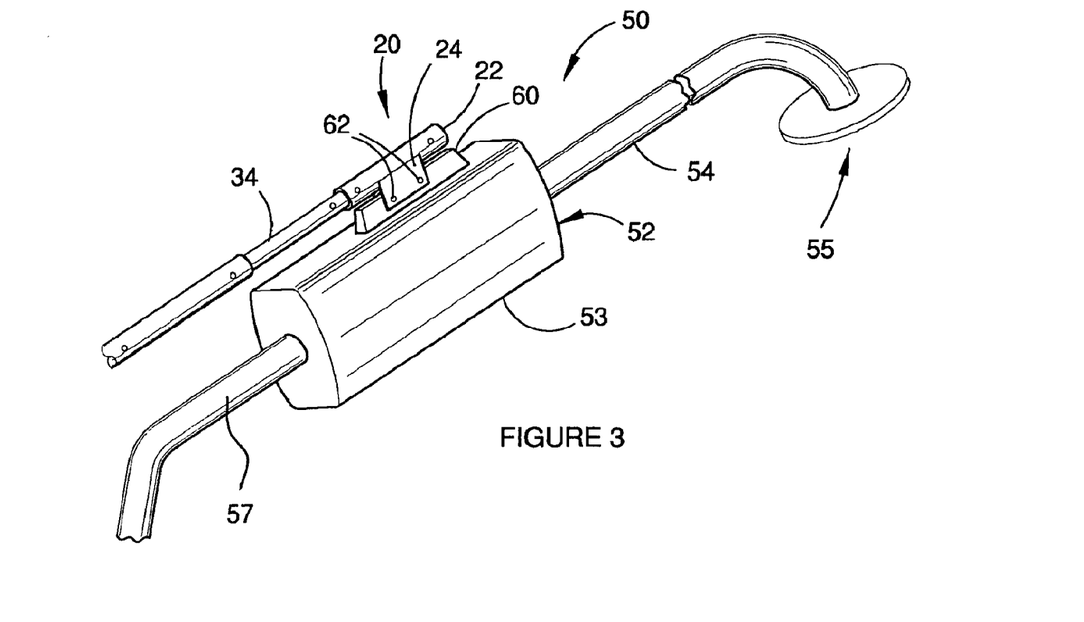
FIG. 3 diagrammatically depicts a powered sanding apparatus, including extension pole apparatus, according to an embodiment of the second aspect of the invention.

Turning now to FIG. 3, a common type of powered sanding apparatus 50 has a motor unit 52 with an outer housing 53. From one end of housing 53 projects a first hollow rigid shaft 54 that terminates at a sanding head 55, which is driven by the motor within unit 52 via a cable drive in shaft 54. From the other end of motor unit 52, a second hollow rigid shaft 57 conveys sawdust debris drawn back into unit 52 from sanding head 55 to an attached hose and thence to a suitable receptacle (not shown). Outer housing 53 of motor unit 52 has an external projecting elongate rib 60 generally aligned with the end-to-end orientation of the motor unit. The invention makes use of this rib 60 for the purpose of stably and rigidly attaching extension pole apparatus 10. In the embodiment under discussion, extension pole apparatus 10 is secured to motor unit 52 by placing rib 60 between plates 24, 25 and applying bolts or other suitable fasteners through two matching pairs of apertures 62, 29 on the rib and on the attachment component 20.

Figure 4:
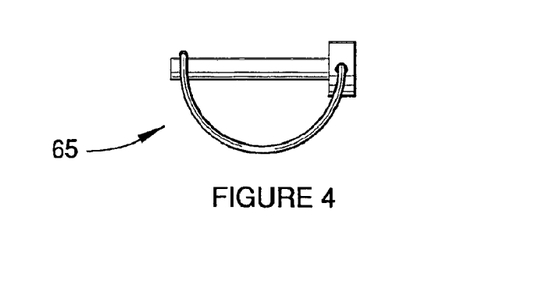
FIG. 4 shows a suitable locking pin for use with the extension pole apparatus of FIGS. 1 to 3.

In one application of the invention, a sanding contractor already possessing a powered sanding apparatus 50 would obtain extension pole apparatus 10 as a kit and "permanently" fix attachment component 20 to the rib 60 as described above. To extend the reach of the sanding head, the user of the equipment would fit inner tube 34 into the tubular body 22 and lock it in place with a transverse locking pins such as that shown at 65 in FIG. 4, received through matching pairs of apertures 23, 35 in tubular body 22 and in inner tube 34. Outer tube 32, fitted with hand grip 36, can then be slid over tube 34 to an appropriate position for the required reach and the two tubes locked at the chosen position by a second transverse pin coupling one of multiple selectable apertures 35 in tube 34 and one of multiple selectable apertures 33 in tube 32.

In another application of the invention, a supplier of sanding equipment such as apparatus 50 might supply the equipment with the attachment component 20 already fixed in position, for example by rivets or bolts, to rib 60, and with the telescopic component 30 provided as an accessory.

It will be appreciated that by virtue of the positive and rigid aligned engagement of the attachment component 20 to the motor unit 52, an alignment which also matches the projection of arm 52, it is possible to optimally extend the reach of sanding head 55 while holding hand grip 36 and if necessary also the tube 32.

Figure 5:
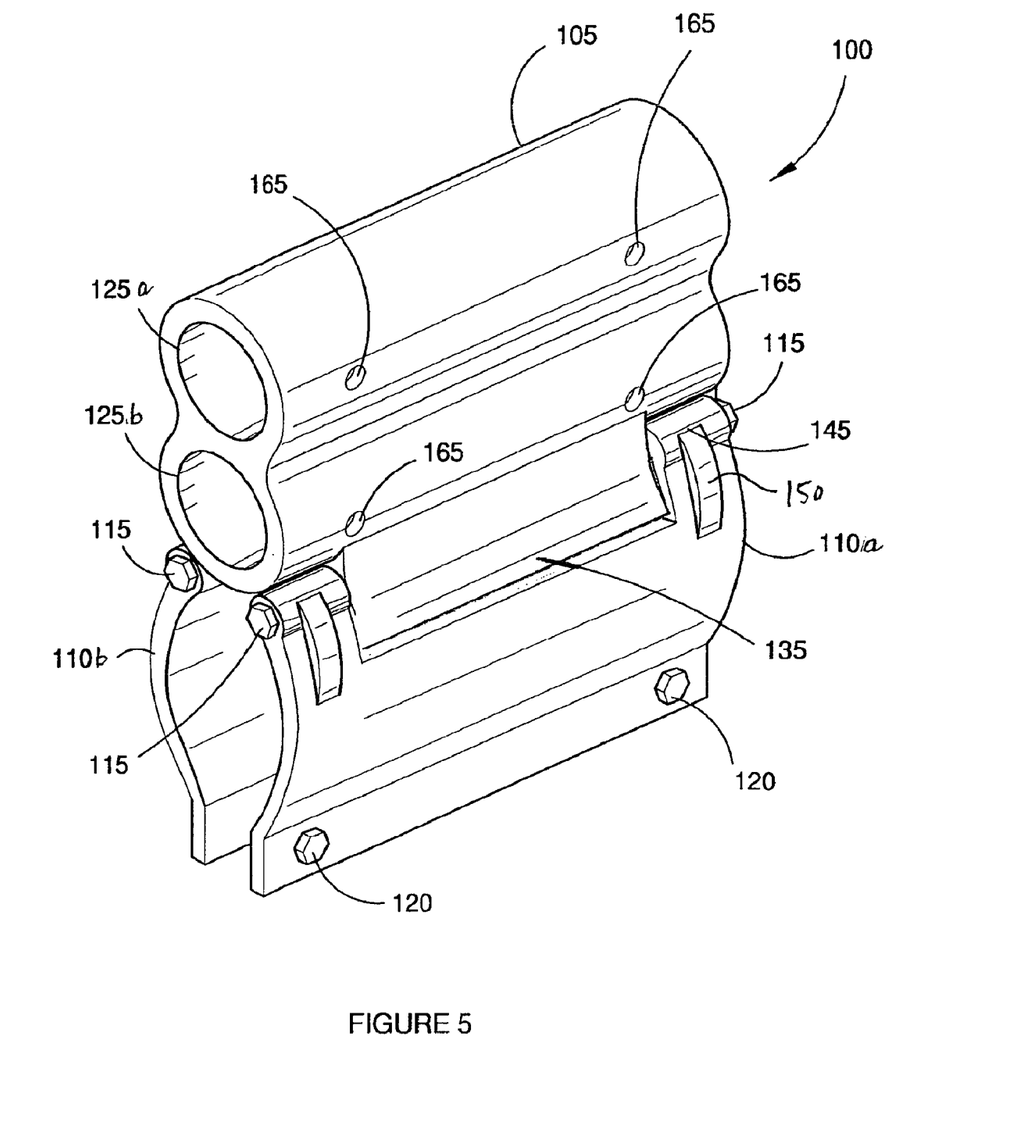
FIG. 5 is an isometric view of an attachment component for extension pole apparatus according to a second embodiment of the invention.

FIGS. 5 to 12 illustrate a second embodiment of the invention. FIG. 5 shows an attachment component 100 having an elongate body 105 and a pair of opposed plates 110a,110b. The plates 110a,110b are pivotally mounted to the elongate body 105 by bolts 115, project laterally from body 105, and extend generally parallel to the longitudinal direction of body 105.

Figure 6:
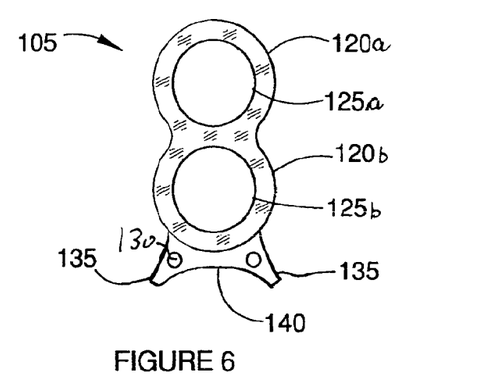
FIG. 6 is an end view of the elongate body portion of the attachment component of FIG. 5.
Figure 7:
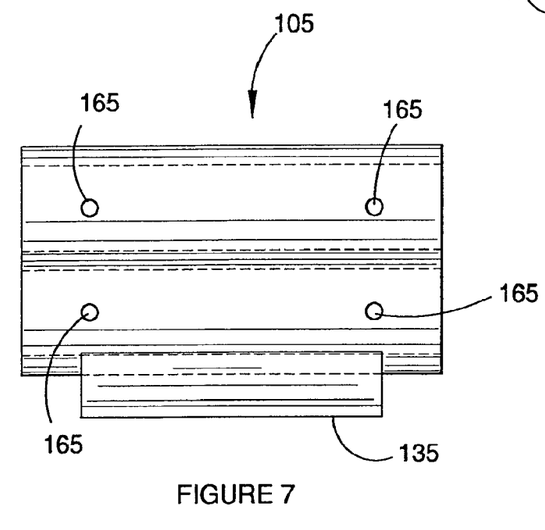
FIG. 7 is a side view of the elongate body of FIG. 6.
Figure 8:
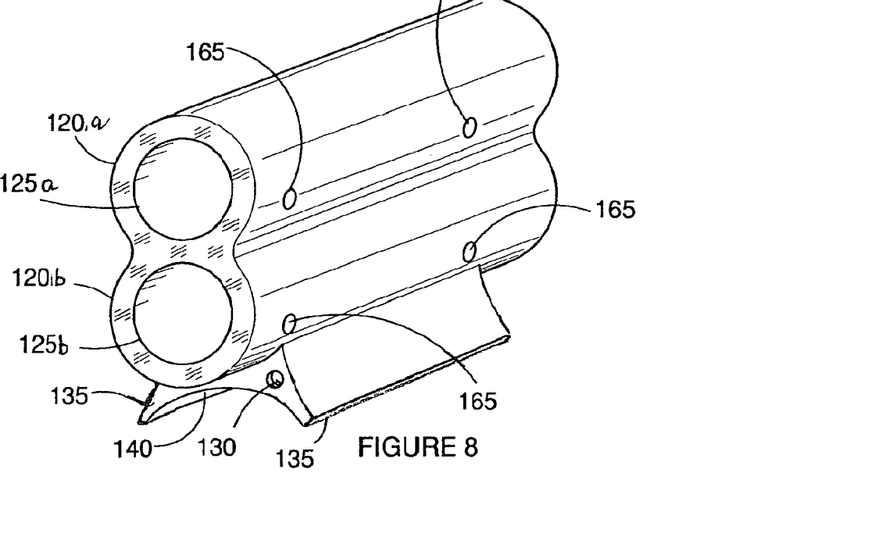
FIG. 8 is an isometric view of the elongate body of FIG. 6.

FIGS. 6 to 8 illustrate the elongate body 105. The body 105 includes tubular formations 120a,120b having longitudinally extending passages 125a,125b for receiving the extension handle. The tubular formations 120a, 120b are integrally joined together in a figure eight configuration. Projecting from the bottom of the figure eight configuration are respective obliquely extending and relatively splayed wings 135. The wings 135 extend for most of the length of the elongate body 105 but are truncated from end portions of the body 105 as illustrated in FIG. 7. The truncation of the wings 135 leaves a space for the hinge portions 145 of the plates 110. Body 105 has spaced pairs of holes 165 that extend wholly or partially through each tubular formation 120a,120b so that their axes intersect the axes of passages 125a,125b: these holes 165 accommodate bolts or screws for retaining inner tube 34 in either passage.

As illustrated in FIG. 6 the end faces of the wings 135 are provided with respective threaded holes 130 for receiving a threaded end of the bolts 115.

Figure 9:
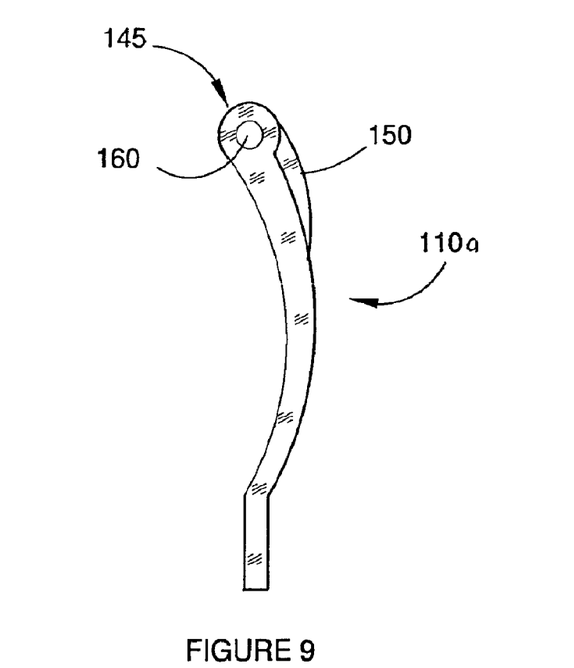
FIG. 9 is an end view of the clamping arm of the attachment component of FIG. 5.
Figure 10:
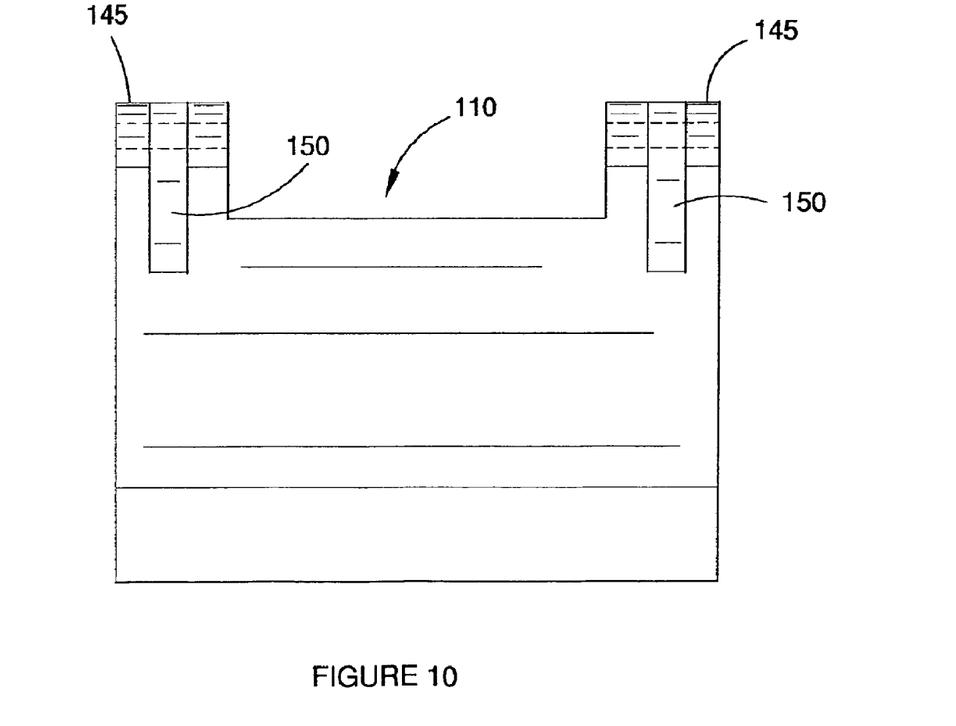
FIG. 10 is a side view of the clamping arm of FIG. 9.
Figure 11:
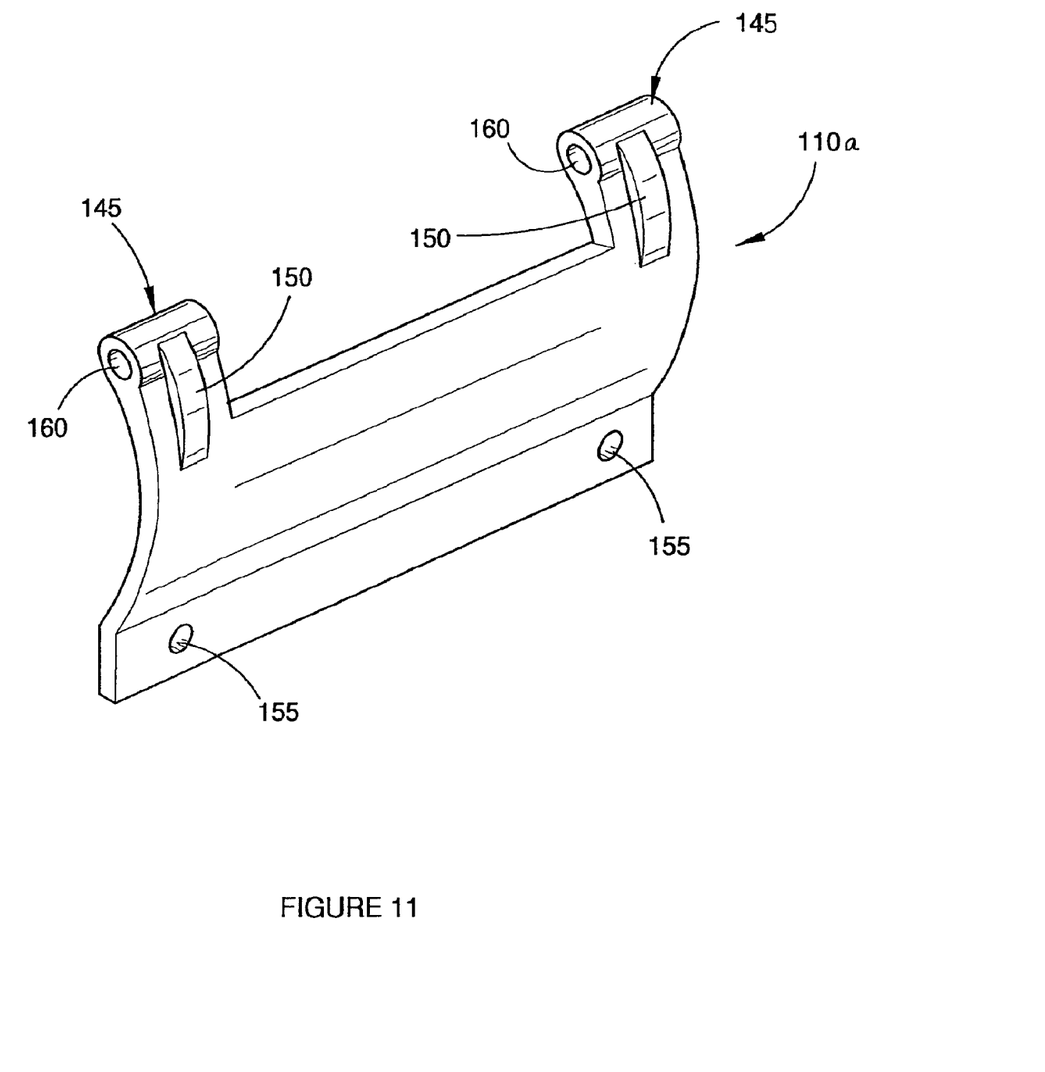
FIG. 11 is an isometric view of the clamping arm of FIG. 9.

The plate 110a is illustrated in FIGS. 9 to 11. Plate 110b is a mirror image. The plate has a curvature in cross-section generally corresponding to the curvature of the shaft 54 or 57 of the sanding apparatus (FIG. 3). In a sanding apparatus to which this embodiment is adapted, the shaft 54 has an oval-shaped cross-section for accommodating both an evacuation conduit and a cable for driving the sanding head.

Hinge portions 145 extend upwardly from a long edge of the curved plate 110*a* adjacent each end. The hinge portions have through holes or bores 160 for receiving, with a clearance fit, a non-threaded portion of bolts 115.

The region surrounding each of the bolt holes 160 is thickened and is provided with a gusset strengthening rib 150 that extends from the thickened region down to blend into the outer surface of the respective plate. Toward the other long edge of each plate 110*a*,110*b* remote from hinge portions 145 transverse bolt holes 155 are provided in the plate for a purpose to be described.

Figure 12:
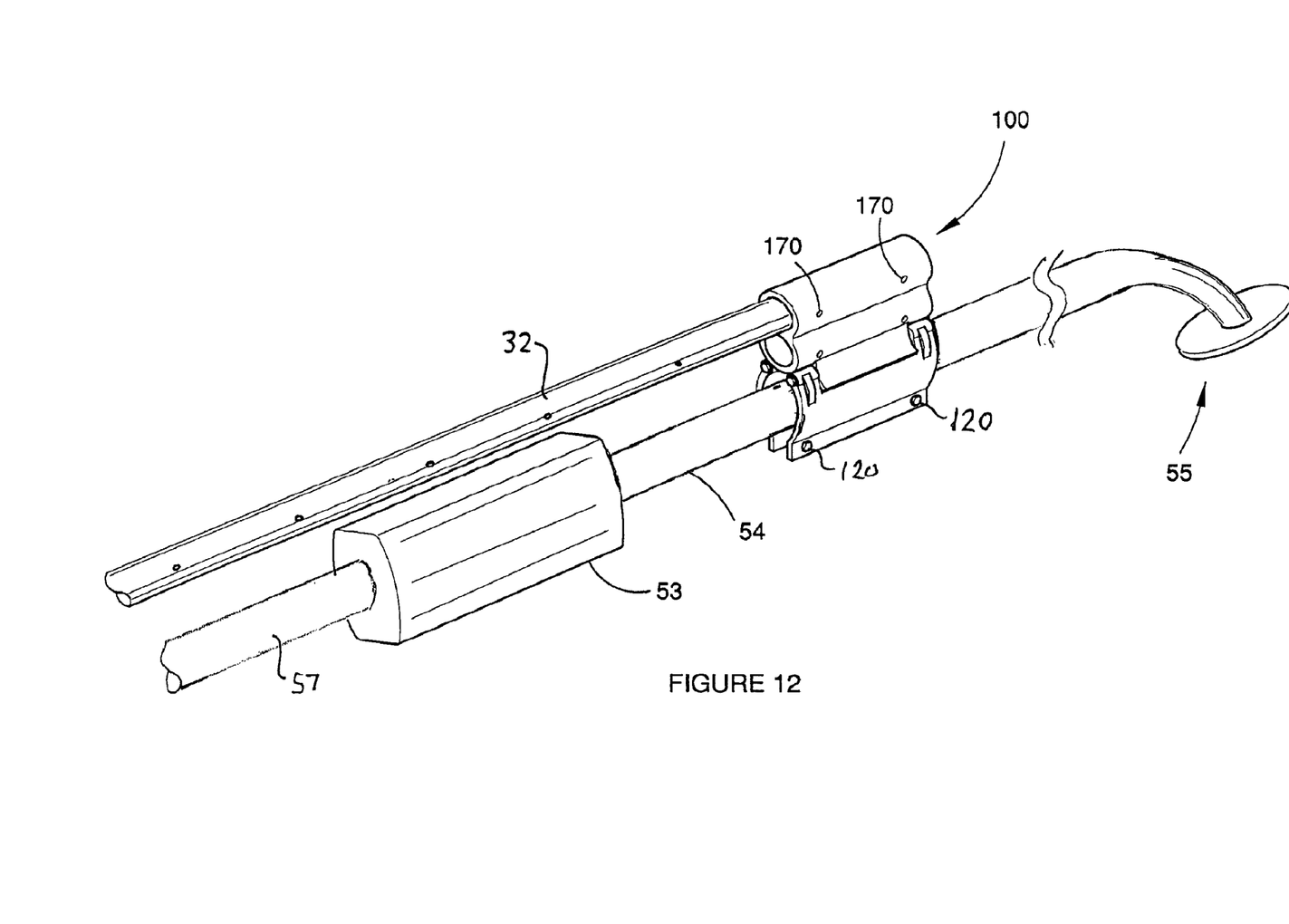
FIG. 12 diagrammatically depicts a powered sanding apparatus including extension pole apparatus according to the second embodiment of the invention.
Figure 13:
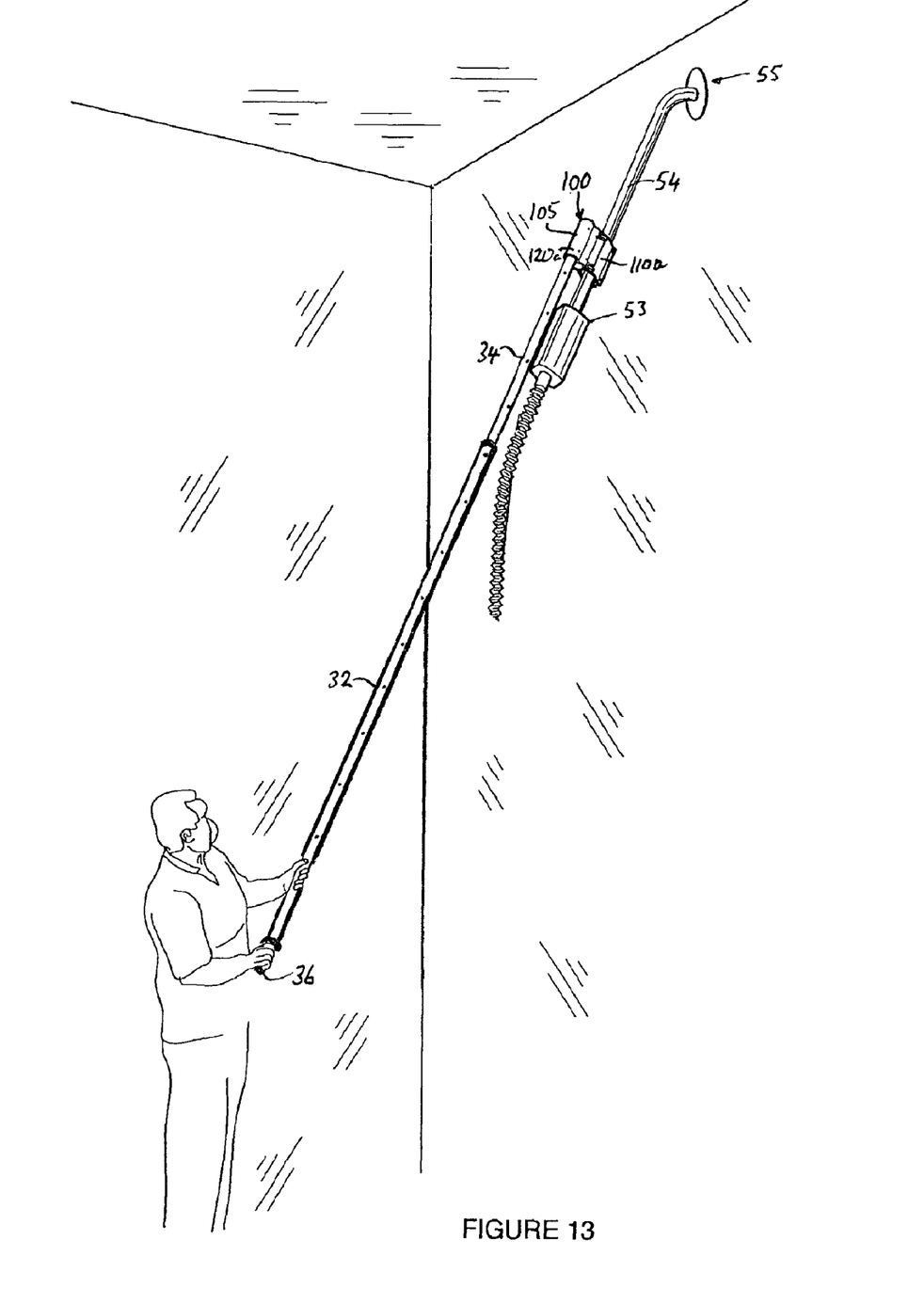
FIG. 13 illustrates the apparatus of FIG. 12 in use.

FIG. 12 illustrates the attachment component 100 mounted to a powered sander, and FIG. 13 depicts the equipment in use with a telescopic extension pole similar to that shown in FIG. 1. Plates 110*a*,110*b* have been moved apart and then brought together to wrap around and be clamped to the shaft 54. Clamping is effected by means of bolts 120 passing through bolt holes 155 and retained by nuts (not shown) on the far side of the pair of plates. Inner tube 34 of component 30 is inserted into passage 125*a*,125*b* and, as with first embodiment, is securely retained by screws or bolts 170 that pass through holes 165 and are retained by locknuts. It will be seen that shaft 54 is an aligned element of the sanding apparatus, and that inner tube 34, elongate body 105, plates 110*a*,110*b* and shaft 54 are generally aligned and parallel.

The alternative passages 125*a*,125*b* for inner tube 34 allow for different sizes of motor unit 53, while ensuring that the inner tube 34 sits close to the side face of the motor unit.

In a modification, the telescopically extensible pole component has a central 3 meter outer tube section, a 1 meter inner tube section slidably received within the 3 meter tube and a 2 meter inner tube section also receivable within the 3 meter tube. Either inner tube is receivable into tubular body 22 or 105. This advantageously provides a range of adjustment of the pole length from a little over 3 m up to a little under 6 m. The relative positions of the pole sections and hence the length of the pole is fixed by spring-loaded snap locks at each end of the central section. The snap locks include outwardly biased projections on the inner pole sections (i.e. the 1 and 2 meter sections) arranged to project outwardly and engage corresponding holes formed in the outer pole section (i.e. the 3 meter section). Advantageously the holes in the outer pole section are spaced at about 200 mm pitch.

It will be understood that the invention disclosed and defined in this specification extends to all alternative combinations of two or more of the individual features mentioned or evident from the text or drawings. All of these different combinations constitute various alternative aspects of the invention.

The invention claimed is:

1. A powered sanding apparatus including:
    a sanding head coupled by a hollow shaft to a motor unit for driving the sanding head;
    an attachment component having an elongate body that is adapted to receive an extension pole component so that the latter extends generally parallel to the longitudinal direction of the body and a pair of plates that are mounted to and project laterally from said elongate body, which plates extend generally parallel to the longitudinal direction of said body for receiving between them said hollow shaft so that the body is adjacent and generally aligned with the hollow shaft, said attachment component further having means by which the plates may be rigidly fastened to said hollow shaft.

2. A powered sanding apparatus according to claim 1 wherein said attachment component is mounted to said hollow shaft or motor unit.

3. A powered sanding apparatus according to claim 1, further including fastening means for fastening the extension pole component to said elongate body.

4. A powered sanding apparatus according to claim 1 wherein the extension pole component is a telescopic assembly.

5. A powered sanding apparatus according to claim 4 wherein the telescopic assembly has an intermediate outer tube and respective inner tubes slidably receivable into the intermediate outer tube at its respective ends, and wherein at least one of the inner tubes is receivable into said elongate body.

6. A powered sanding apparatus according to claim 4, further including a handle or grip attachable to an end of the telescopic assembly remote from an end receivable into said elongate body.

7. A powered sanding apparatus according to claim 3 wherein said means by which the extension pole component may be fastened to the attachment component includes a spaced pair of transverse holes in said elongate body.

8. A powered sanding apparatus according claim 1 wherein said elongate body has at least two longitudinally extending passages into each of which the extension pole component is selectively receivable.

9. A powered sanding apparatus according to claim 1 wherein said pair of plates are of generally curved profile and are pivotally mounted to the elongate body so that they may be moved apart and then brought together about and clamped to the hollow shaft of the powered sanding apparatus.

10. A powered sanding apparatus according to claim 9 wherein said pivotally mounted plates have respective hinge portions spaced along an edge of the plate that are pivotally mounted to said elongate body.

11. A powered sanding apparatus according to claim 9 wherein said pivotally mounted plates further include at least two pairs of longitudinally spaced complementary holes for receiving clamping bolts.

12. An extension pole apparatus including:
    an attachment component having an elongate body that is adapted to an extension pole component so that the latter extends generally parallel to the longitudinal direction of the body, a pair of plates that are mounted to and project laterally from the body, which plates extend generally parallel to the longitudinal direction of said body for receiving between them a hollow shaft of a powered sanding apparatus, the plates being of generally curved profile and pivotally mounted to the elongate body so that they may be moved apart and then brought together about and clamped to the hollow shaft;
    an extension pole component receivable by said elongate body; and
    fastening means for fastening the extension pole component to the attachment component when the attachment component is received by said elongate body.

13. An extension pole apparatus according to claim 12 wherein the extension pole component is a telescopic assembly.

14. An extension pole apparatus according to claim 13 wherein the telescopic assembly has an intermediate outer tube and respective inner tubes slidably receivable into the intermediate outer tube at its respective ends, and wherein at least one of the inner tubes is receivable into said elongate body.

15. An extension pole apparatus according to claim 13, further including a handle or grip attachable to an end of the telescopic assembly remote from an end receivable into said elongate body.

16. An extension pole apparatus according to claim 12 wherein said elongate body has at least two longitudinally extending passages into each of which the extension pole component is selectively receivable, the passages in use being at differing distances from the powered sanding apparatus.

17. An extension pole apparatus according to claim 12 wherein said pivotally mounted plates have respective hinge portions spaced along an edge of the plate that are pivotally mounted to said elongate body.

18. An extension pole apparatus according to claim 12 wherein said pivotally mounted plates further include at least two pairs of longitudinally spaced complementary holes for receiving clamping bolts or the like.

19. An attachment component for an extension pole apparatus, including an elongate body that is adapted to receive an extension pole component so that the latter extends generally parallel to the longitudinal direction of the body, and a pair of plates that are mounted to and project laterally from the elongate body, which plates extend generally parallel to the longitudinal direction of said body for receiving between them a hollow shaft of a powered sanding apparatus, the plates being of generally curved profile and pivotally mounted to the elongate body so that they may be moved apart and then brought together about and clamped to the hollow shaft, and means by which an extension pole component may be fastened to the attachment component while in said body of the attachment component.

20. An attachment component according to claim 19 wherein said elongate body has at least two longitudinally extending passages into each of which the extension pole component is selectively receivable, the passages in use being at differing distances from the powered sanding apparatus.

21. An attachment component according to claim 20 wherein said pivotally mounted plates have respective hinge portions spaced along an edge of the plate that are pivotally mounted to said elongate body.

22. An attachment component according to claim 20 wherein said pivotally mounted plates further include at least two pairs of longitudinally spaced complementary holes for receiving clamping bolts or the like.

23. An attachment component according to claim 19 wherein said means by which the extension pole component may be fastened to the attachment component includes a spaced pair of transverse holes in said elongate body.

24. An extension pole apparatus, including:
an attachment component including an elongate body having at least two longitudinally extending passages, each passage being adapted to receive an extension pole component so that the latter extends generally parallel to the longitudinal direction of the body, at least one plate that is mounted to and projects laterally from the body, which plate extends generally parallel to the longitudinal direction of said body, and means by which the plate may be rigidly fastened to an aligned element of a powered sanding apparatus;
an extension pole component receivable into said elongate body; and
means by which the extension pole component may be fastened to the attachment component while it is received in said elongate body;
the passages in use being at differing distances from the powered sanding apparatus.

25. An extension pole apparatus according to claim 24 wherein the extension pole component is a telescopic assembly.

26. An extension pole apparatus according to claim 25 wherein the telescopic assembly has an intermediate outer tube and respective inner tubes slidably receivable into the intermediate outer tube at its respective ends, and wherein at least one of the inner tubes is receivable into said elongate body.

27. An extension pole apparatus according to claim 25, further including a handle or grip attachable to an end of the telescopic assembly remote from an end receivable into said elongate body.

28. An extension pole apparatus according to claim 24 wherein said plate is one of a pair of plates that are mounted to and project laterally from the body, which plates extend generally parallel to the longitudinal direction of said body for receiving between them the hollow shaft or the rib.

29. An attachment component for an extension pole apparatus, including an elongate body having at least two longitudinally extending passages, each passage being adapted to receive an extension pole component so that the latter extends generally parallel to the longitudinal direction of the body, and a pair of plates that are mounted to and project laterally from the elongate body, which plates extend generally parallel to the longitudinal direction of said body for receiving between them an aligned element of a powered sanding apparatus, means by which the plates may be rigidly fastened to said aligned element, and means by which an extension pole component may be fastened to the attachment component while it is received in said body of the attachment component; the passages in use being at differing distances from the powered sanding apparatus.

* * * * *

UNITED STATES PATENT AND TRADEMARK OFFICE
CERTIFICATE OF CORRECTION

PATENT NO. : 8,206,200 B2  
APPLICATION NO. : 12/443147  
DATED : June 26, 2012  
INVENTOR(S) : A. Stott Page 1 of 1

It is certified that error appears in the above-identified patent and that said Letters Patent is hereby corrected as shown below:

ERROR

Title Page,  
Item (75)    Inventor    "Ferntree Gull" should read --Ferntree Gully--

Signed and Sealed this  
Twenty-third Day of July, 2013

Teresa Stanek Rea  
*Acting Director of the United States Patent and Trademark Office*